US012701484B2

(12) United States Patent
Peitzer et al.

(10) Patent No.: US 12,701,484 B2
(45) Date of Patent: **\*Aug. 4, 2026**

(54) INTELLIGENT PACKET CORE SELECTION

(71) Applicant: AT&T Intellectual Property I, L.P., Atlanta, GA (US)

(72) Inventors: Haywood S. Peitzer, Randolph, NJ (US); Tracey Green, Louisville, KY (US); Todd Wallace, Hamilton, MT (US)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 19 days.

This patent is subject to a terminal disclaimer.

(21) Appl. No.: 18/820,614

(22) Filed: Aug. 30, 2024

(65) Prior Publication Data

US 2024/0430771 A1 Dec. 26, 2024

Related U.S. Application Data

(63) Continuation of application No. 17/376,361, filed on Jul. 15, 2021, now Pat. No. 12,108,300.

(51) Int. Cl.
| | |
|---|---|
| *H04W 36/30* | (2009.01) |
| *H04W 36/00* | (2009.01) |
| *H04W 36/08* | (2009.01) |

(52) U.S. Cl.
CPC ..... *H04W 36/305* (2018.08); *H04W 36/0058* (2018.08); *H04W 36/00837* (2018.08); *H04W 36/08* (2013.01); *H04W 36/13* (2023.05)

(58) Field of Classification Search
CPC ........... H04W 36/305; H04W 36/0058; H04W 36/00837; H04W 36/08; H04W 36/13; H04W 36/008375; H04W 36/00838; H04W 36/083; H04W 36/085; H04W 36/087
See application file for complete search history.

(56) References Cited

U.S. PATENT DOCUMENTS

| | | | |
|---|---|---|---|
| 10,673,751 B2 | 6/2020 | Dowlatkhah et al. | |
| 2019/0132725 A1* | 5/2019 | Venkataramanan .. | H04W 24/08 |
| 2019/0268820 A1* | 8/2019 | Yang ..................... | H04W 76/27 |
| 2020/0084734 A1* | 3/2020 | Kwok ................. | H04W 52/146 |
| 2021/0282127 A1* | 9/2021 | Chaudhary ....... | H04W 52/0277 |
| 2023/0015436 A1 | 1/2023 | Peitzer et al. | |

OTHER PUBLICATIONS

Ismail, Adam , "iPhone 12 Smart Data Mode: What It is and How It Works", Tom's Guide, Oct. 25, 2020, 4 pages.

\* cited by examiner

*Primary Examiner* — Ji-Hae Yea
(74) *Attorney, Agent, or Firm* — Guntin & Gust, PLC; Miyoung Shin

(57) ABSTRACT

Aspects of the subject disclosure may include, for example, detecting at a mobile device a communication failure of a data connection between the mobile device and a source core network of a plurality of core networks available to the mobile device, the mobile device communicating with a respective core network of the plurality of core networks through a radio access network, selecting a destination core network of the plurality of core networks, and handing off the data connection from the source core network to the destination core network. Other embodiments are disclosed.

20 Claims, 10 Drawing Sheets

252

270

300

600

INTELLIGENT PACKET CORE SELECTION

CROSS-REFERENCE TO RELATED APPLICATION(S)

The present application claims priority to and is a continuation of U.S. patent application Ser. No. 17/376,361, filed Jul. 15, 2021, all sections of the aforementioned application(s) and/or patent(s) are incorporated herein by reference in their entirety.

FIELD OF THE DISCLOSURE

The subject disclosure relates to systems and methods for intelligent packet core selection in a communication system.

BACKGROUND

Mobile devices and radio access networks communicate with a packet core network. The packet core network communicates packets to external networks including the internet.

BRIEF DESCRIPTION OF THE DRAWINGS

Reference will now be made to the accompanying drawings, which are not necessarily drawn to scale, and wherein.

DETAILED DESCRIPTION

Figure 1:
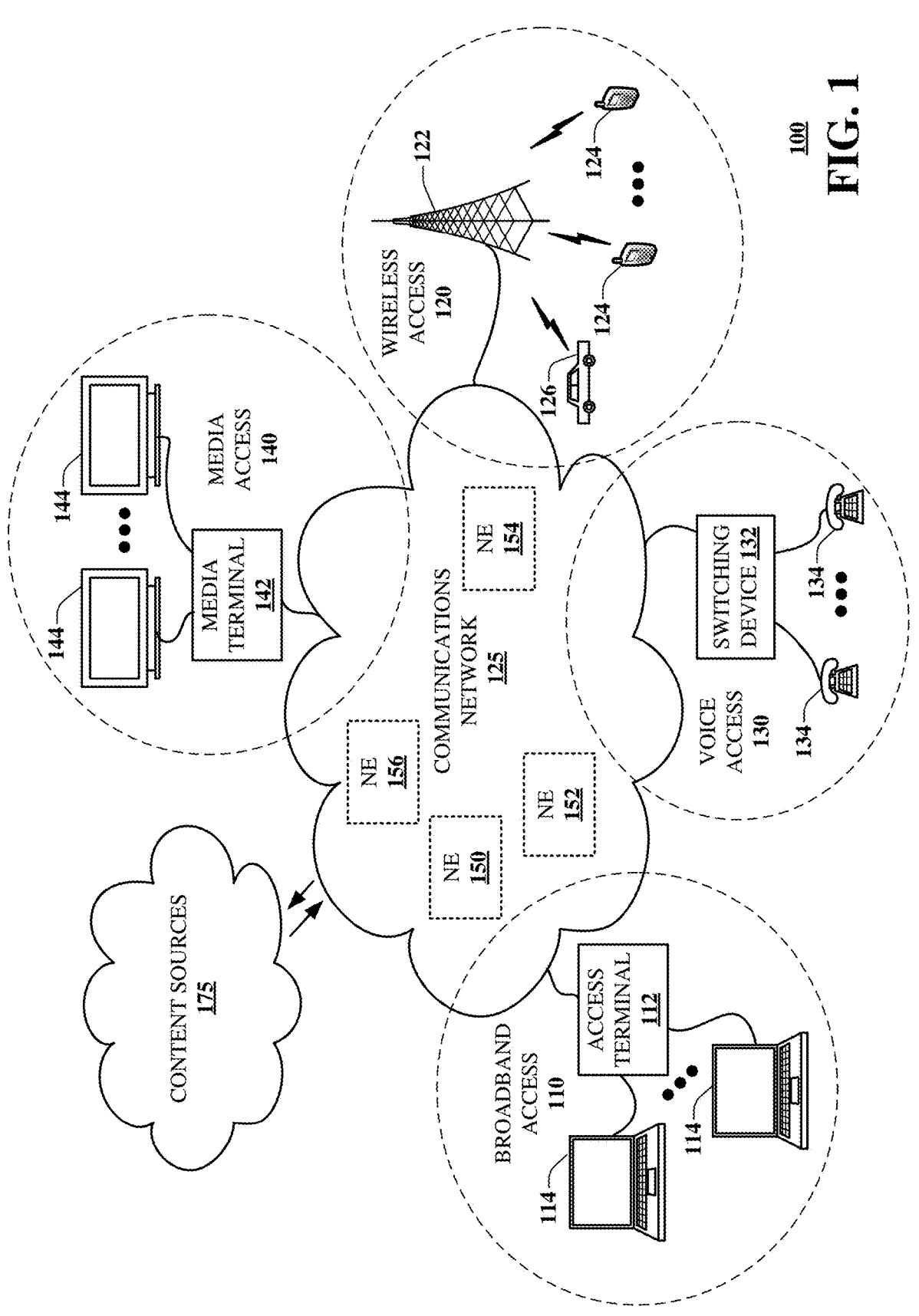
FIG. 1 is a block diagram illustrating an exemplary, non-limiting embodiment of a communications network in accordance with various aspects described herein.

The subject disclosure describes, among other things, illustrative embodiments for intelligent packet core selection by a mobile device operating on a mobility network served by multiple packet core networks. New radio access technologies like fifth generation cellular (5G) do not always provide the best user experience or use of network resources from the perspective of a mobile device. The same may be true for a new technology packet core network, where new virtualized functions, proxies, and firewalls often hurt user experience. Other embodiments are described in the subject disclosure.

One or more aspects of the subject disclosure include connecting the device to a radio access network, including communicating with a first core network of a plurality of core networks available to the device, communicating with a remote network through the first core network and identifying a degradation in a key performance indicator for the communicating with a remote network through the first core network. Aspects of the disclosure further include selecting a second core network of the plurality of core networks, initiating communication with the second core network, and communicating with the remote network through the second core network to eliminate the degradation in in a key performance indicator for the communicating with a remote network.

One or more aspects of the subject disclosure include attaching a mobile device to a radio access network operated by a service provider, communicating, through the radio access network, with a first packet core network of a plurality of packet core networks operated by the service provider, and communicating with a remote network source, wherein the first packet core network provides packet data communication between the remote network source and the mobile device. Aspects of the subject disclosure further include identifying a communication degradation due to a communication failure of the first packet core network, wherein the identifying comprises comparing a selected communication parameter with a predetermined threshold value and selecting a second packet core network of the plurality of packet core networks operated by the service provider, wherein the selecting is responsive to the selected communication parameter failing to exceed the predetermined threshold value. Aspects of the subject disclosure further include initiating communication with the second packet core network by the mobile device through the radio access network and communicating with the remote network source, wherein the second packet core network provides packet data communication between the remote network source and the mobile device.

One or more aspects of the subject disclosure include detecting at a mobile device a communication failure of a data connection between the mobile device and a source core network of a plurality of core networks available to the mobile device, the mobile device communicating with a respective core network of the plurality of core networks through a radio access network, selecting a destination core network of the plurality of core networks, and handing off the data connection from the source core network to the destination core network.

Referring now to FIG. 1, a block diagram is shown illustrating an example, non-limiting embodiment of a system 100 in accordance with various aspects described herein. For example, system 100 can facilitate in whole or in part <tie to a few of the main features of the claims>. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
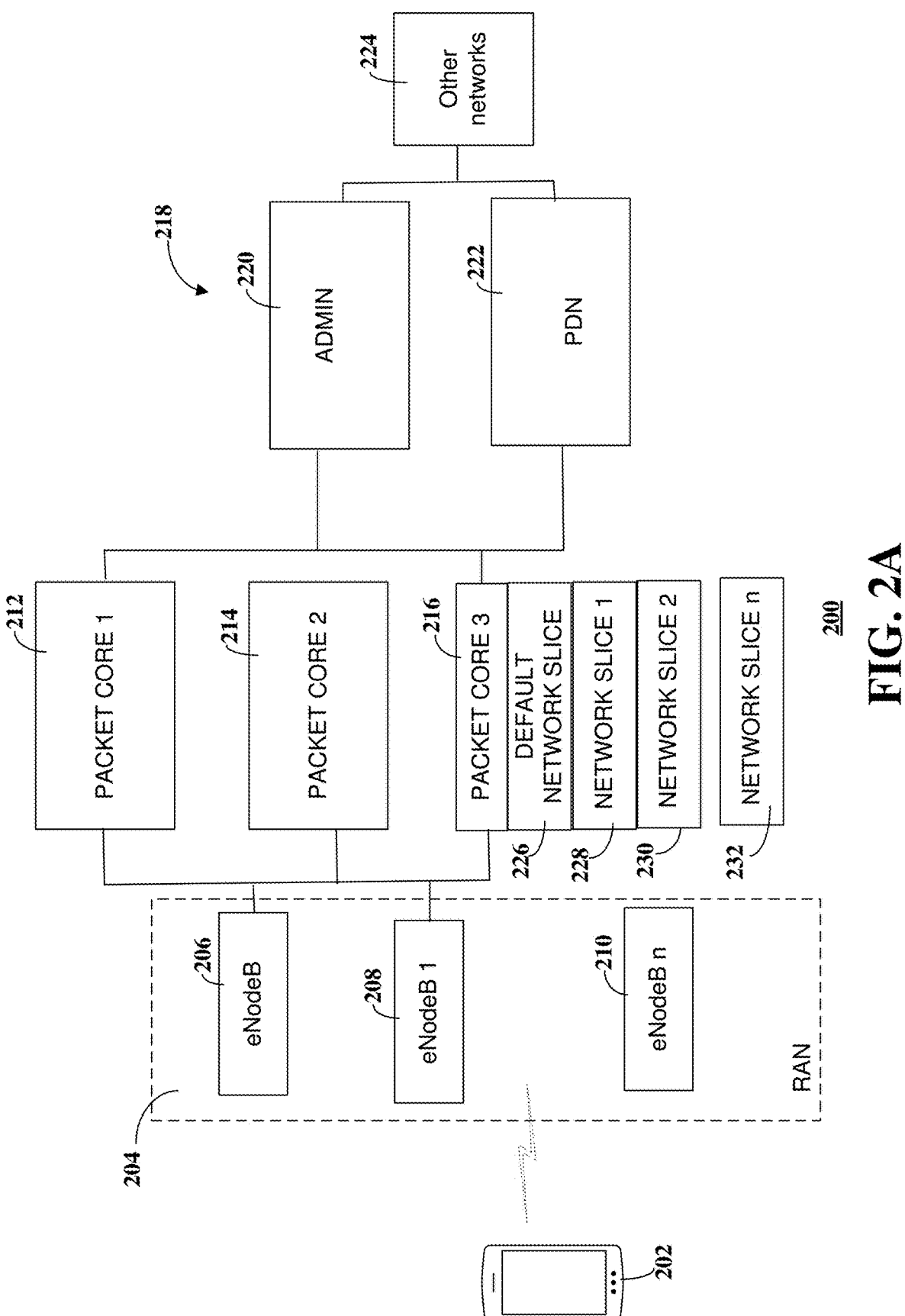
FIG. 2A is a block diagram illustrating an example, non-limiting embodiment of a communication system functioning within the communication network of FIG. 1 in accordance with various aspects described herein.

FIG. 2A is a block diagram illustrating an example, non-limiting embodiment of a communication system 200 functioning within the communications network 125 of FIG. 1 in accordance with various aspects described herein. The communication system 200 in the exemplary embodiment includes a mobile device 202, a radio access network (RAN) 204, a first packet core network 212, a second packet core network 214 and a third packet core network 216, network administrative functions 218 and access to other networks 224.

For providers of mobility networks, the packet core which serves the mobility network is growing more complex every day. With higher complexity comes more failures. These failures are often protocol specific. For less popular data protocols, network operations teams may not even be aware that there is a problem because of lower volume. The impacts of such network failures to customers can range from total loss of connectivity to degraded performance, such as slower data communication speeds on the network. Some network providers operate three or more different packet core networks. The respective packet core networks might be made by different vendors. The packet core networks might have been built out for previous generations of technology. While newest (5G cellular) core network may be degraded, older core networks often provide good, reliable service. This type of variable reliability across networks may get even more pronounced as network slicing becomes more commonplace in 5G cellular and subsequent generations. Handset vendors have developed automatic mechanisms to address similar problems with 5G cellular radio network that, for example, allow the handset to switch to fourth generation (LTE, or 4G cellular) to deliberately avoid problems on new 5G cellular networks.

The mobile device 202 is an example of a device that communicates with the RAN 204. The RAN 204 includes a number of base stations or evolved node B devices generally referred to as eNodeB. In the example of FIG. 2A, the RAN 204 includes a first eNodeB 206, a second eNodeB 208 and a third eNodeB 210. Generally, each respective eNodeB provides radio communication service to a respective geographic area near the eNodeB.

The mobile device 202 has the ability to switch from communicating with a first base station to communicating with a second base station. As the mobile device 202 travels through a region, radio communication is handed off among respective eNodeB devices. For example, the mobile device 202 may initially establish communication with the first eNodeB 206. Communication may include a voice call, a data call or other communications. Generally, all communications between the mobile device 202 and an eNodeB are arranged in data packets. As the mobile device 202 moves from a service area of the first eNodeB 206 to a service area of the second eNodeB 208, the mobile device 202 will initiate communication with the second eNodeB 208. At a suitable time, the mobile device will drop communications with the first eNodeB 206 and communicate solely with the second eNodeB 208. This process may occur also if performance between the mobile device 202 and a first base station degrades and performance with another base station is expected to be better. The performance variation may be due to signal quality, traffic congestion or quality, or any other reasons. This process is generally referred to as a handoff or handover of communication between base stations.

The RAN operates according to an air interface standard. The air interface standard defines details of radio communications between mobile devices such as the mobile device 202 and other equipment such as the first eNodeB 206, the second eNodeB 208 and the third eNodeB 210. The air interrace standard defines signaling, for example, for initiating radio communication, terminating communication and handover of communication. Examples of air interface standards and communications may include various cellular and radio communications systems, such as third generation cellular or 3G, fourth generation cellular or 4G, long-term evolution or LTE, fifth generation cellular or 5G and others as well. Generally, equipment maintains backward compatibility so that a 3G base station that has been in service for a few years can reliably communicate with a new 5G mobile phone such as mobile device 202. Multiple radio access networks may overlap and provide different types of service to mobile devices such as mobile device 202.

The communication system 200, including the RAN 204, in some embodiments is operated by a network operator. The network operator provides communication services to subscribers such as users of mobile devices such as the mobile device 202. Such communication services may include voice and data communication among mobile devices through the RAN 204. Such communication services may include voice and data communication to other networks including land line telephone networks, public network such as the internet and private networks.

The network operator may maintain one or more core networks such as the first packet core network 212, the second packet core network 214 and the third packet core network 216. Each respective packet core network provides supervisory and control operations for a portion of a RAN or all of a RAN, and may be accessible by more than one RAN. In the illustrated example, the RAN 204 is in data communication with the first packet core network 212, the second packet core network 214 and third packet core network 216. The RAN 204 in other examples may be in communication with more or fewer packet core networks.

In the illustrated example, the third packet core network 216 includes a plurality of network slices including a default network slice 226. As conditions dictate, additional network slices may be added to the third packet core network 216. For example, as mobile traffic on the radio access network 204 increases, the third packet core network may need to add an additional network slice, such as second network slice 228 to handle the added traffic. If the default network slice 226 is unavailable, one or more additional network slices such as third network slice 230 or fourth network slice 232, may be added to the third packet core network 216. Each respective network slice may be dynamically instantiated and arranged using hardware and software components that may be switched in and out of the network as needed. Use of network slices provides a high degree of flexibility for the third packet core network 216.

To identify other elements of the exemplary communication system 200, the network administrative functions 218 include administration services 220 and a packet data network (PDN) gateway 222. The administration services 220 includes hardware and software providing user-related and subscriber-related information. This may include billing information, service-level information, and other information pertinent to operation of the communication system 200. The PDN gateway 222 serves as the point of interconnect between the packet core networks and other networks 224. Communication among the elements of the communications system 200 may be according to any suitable standard such as TCP/IP, Ethernet, internet protocol (IP), and others.

Figure 2B:
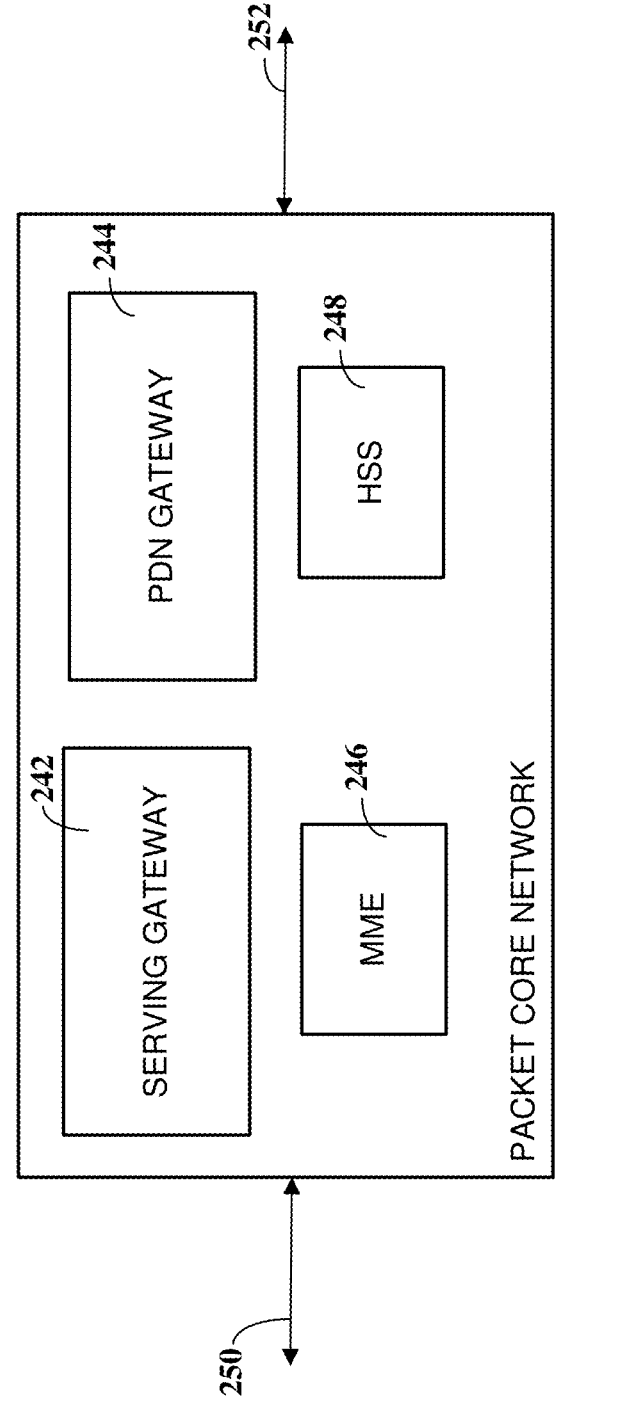
FIG. 2B is a block diagram illustrating an example, non-limiting embodiment of a packet core network functioning within the communication system of FIG. 2A in accordance with various aspects described herein.

FIG. 2B is a block diagram illustrating an example, non-limiting embodiment of a packet core network 240 functioning within the communication system of FIG. 2A in accordance with various aspects described herein. The packet core network 240 in the exemplary embodiment includes a serving gateway 242, a packet data network (PDN) gateway 244, a mobility management entity 246 and a home subscriber server (HSS) 248. The packet core network 240 includes a radio access network port 250 for data communication with one or more radio access networks and, in turn, with user equipment (UE) including mobile devices such as the mobile device 202 (FIG. 2A). The packet core network 240 further includes a PDN port 252 for data communication with other networks such as the internet. Other embodiments may include alternative or additional features.

The serving gateway 242 transports UE data traffic. Such traffic may be communicated between respective UE devices, such as a voice call or messaging Such UE data traffic may be between UE devices and the packet data network, via a radio access network. For example, a particular mobile device may download a file from a network location or may begin streaming a video file from a provider on the network. Data received at the packet core network 240 and intended for the mobile device is forwarded by the packet core network 240 to a radio access network including a base station serving the mobile device.

The PDN gateway 244 serves as an interconnection between the packet core network 240 and packet data networks including public networks such as the internet and private networks. UE data originating or terminating with a location on a packet data network is communicated by the PDN gateway for the packet core network 240.

The mobility management entity 246 processes signaling related to UE devices including mobility and security. In examples, the mobility management entity 246 monitors the location of the mobile device in both idle and active mode, supervises network access and handover, monitors credentials for access and billing, and perform other functions for the mobile device and radio access network.

The HSS 248 stores and maintains user data related to authentication, access and billing. The HSS 248 may cooperate with the mobility management entity 246 to enable call setup, network access, and other functions by the mobile device.

The packet core network 240 operates to connect other networks including the radio access network serving the mobile devices and the PDN. Further, the packet core network 240 manages access by mobile devices to services and features of the mobile network, such as services based on a subscription level of the mobile device or a service plan of the mobile device or user. The packet core network 240 controls mobility include handoff and roaming to and from other networks. In some embodiments, the packet core network 240 may be particularly configured for operation according to a particular technology or generation of cellular service. For example, the packet core network 240 may have been designed and built for 3G cellular, 4G cellular or LTE, 5G cellular or subsequent generations of technology. Because of backward compatibility, later generations of mobile devices can communicate with and operate on the packet core network 240 without regard to the technology used by the packet core network 240.

Figure 2C:
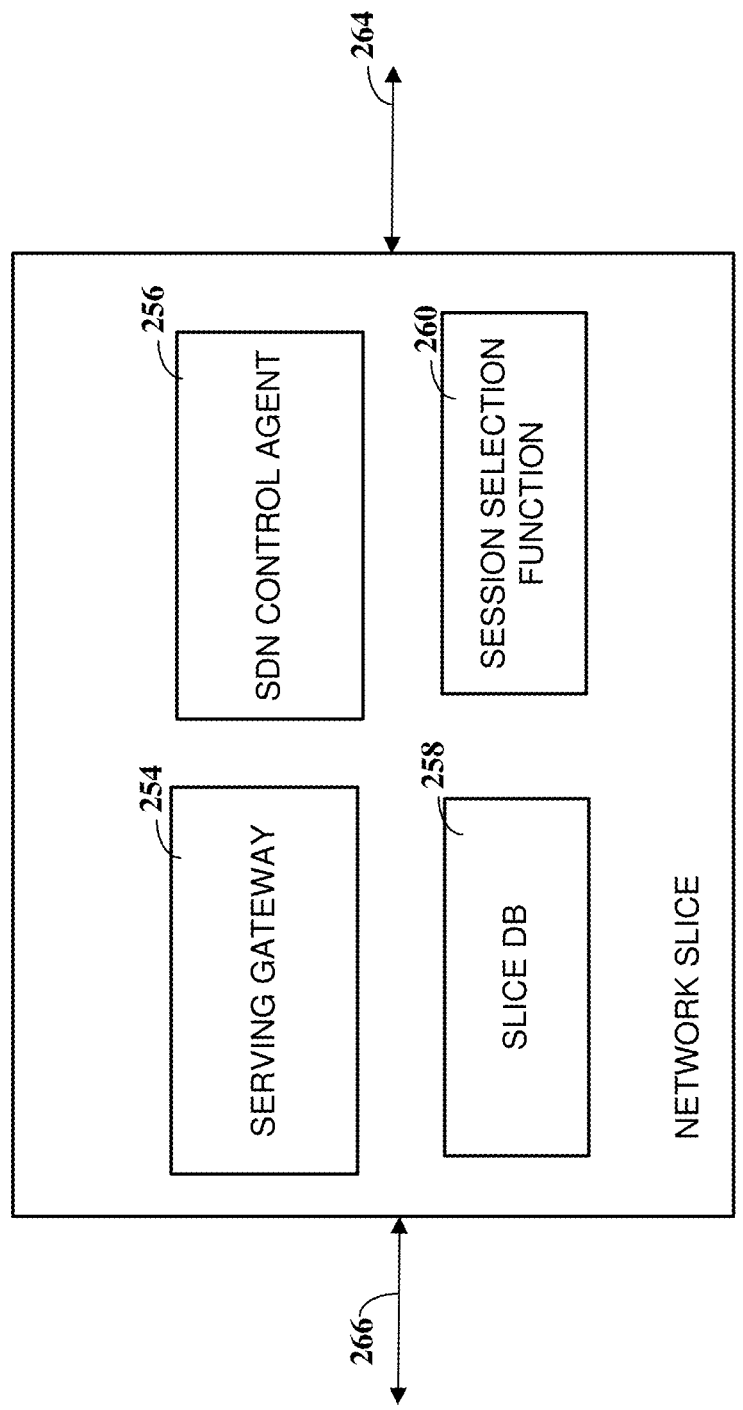
FIG. 2C is a block diagram illustrating an example, non-limiting embodiment of a network slice functioning within the communication system of FIG. 2A in accordance with various aspects described herein.

FIG. 2C is a block diagram illustrating an example, non-limiting embodiment of a network slice 252 functioning within the communication system of FIG. 2A in accordance with various aspects described herein. The network slice 252 may be part of a software defined network which can be configured to perform the functions of a packet core network. The software defined network may be a software-defined system that enables features such as separation of control plane and user plane for carrying signaling traffic and data traffic, respectively, and network slicing. The software defined network enables virtualization of functional aspects of a system.

In an example embodiment, a default network slice such as default network slice 226 (FIG. 2A) can provide an entry point into a communication network, such as a 5G cellular network. The default network slice can provide services for anchoring the connection and determining various characteristics of the mobile device and of services that the mobile device may request. Other instantiated network slices, such as first network slice 228 and second network slice 230, can be specially configured for providing particular services and/or service characteristics to user devices. The default network slice can access database information at other network slices to obtain information regarding services and characteristics of these network slices. The default network slice can use the database information to select one or more of the other network slices for slice chaining.

The network slice 252 in the exemplary embodiment includes a serving gateway 254, a software defined network (SDN) control agent 256, a slice database 258 and a session selection function 260. The network slice 252 includes a radio access network port 262 for data communication with one or more radio access networks and, in turn, with user equipment (UE) including mobile devices such as the mobile device 202 (FIG. 2A). The network slice 252 further includes a PDN port 264 for data communication with other networks such as the internet. Other embodiments may include additional or alternative structures and functions.

The serving gateway 254 operates to process UE data traffic entering a communication network from various communication devices and various radio access networks. The serving gateway 254 can establish initial connectivity with a mobile device. Communication traffic from the mobile device can anchor in the serving gateway 254. The serving gateway 254 can communicate with a packet data network via the PDN port 264 such as through SDN control agent 256, regarding traffic on the packet data network. The serving gateway 254 can communicate with UE devices information regarding services sought by one or more mobile devices. The serving gateway 254 can analyze these services to determine service functions or network data flows that would be required to facilitate delivery of these services to the mobile devices. In one or more embodiments, the serving gateway 254 can allow an initial connection of the mobile device to anchor control plane communication traffic in the network slice 252. In one embodiment, the serving gateway 254 can ensure session continuity over the communication session in light of subsequent changes in user plane communication routing by hair pinning of the control plane connectivity.

The SDN control agent 256 operates as part of the process of instantiating the network slice 252 in a software defined network to perform packet core network functions. For example, the SDN control agent 256 can request establishment of a slice chain between a default network slice 226 (FIG. 2A) and a previously instantiated network slice such as first network slice 228 or second network slice 230 that has been selected for addition to the network. In some embodiments, the SDN control agent 256 can coordinate the establishment of the slice chain by directing the default network slice 226 to redirect user plane communication traffic from the default network slice 226 to the selected network slice. In one embodiment, the SDN control agent 256 can function as a switch in order to dynamically redirect the user plane communication traffic of a mobile device into the selected network slice.

The slice database (DB) 258 operates to store information for use by the network slice 252 in the packet core network. In some embodiments, the slice DB 258 can store one or more characteristics of network slices including the default network slice 226 (FIG. 2A). For example, the slice DB 258 can store information about service offerings and capabilities, policy capabilities, security capabilities, billing function capabilities, and quality of service (QoS) capabilities of the default network slice 226 a mobile device. In embodiments, the slice DB 258 can store information describing cloud storage capabilities, social networking capabilities, and conferencing capabilities. The information that is stored on the slice DB 258 at the default network slice ss6 can be made available to other network slices including network slice 252.

The session selection function 260 can enable the network slice 252 to intercept the communication traffic from mobile devices. The session selection function 260 can determine characteristics of the mobile device, a radio access network, the connectivity to a packet data network, and one or more services that are requested by the mobile device. For example, the session selection function 260 can determine policy capabilities, security capabilities, billing function capabilities, or quality of service (QoS) capabilities of the mobile device, the radio access network, connectivity to the packet data network, and one or more services that are requested.

The network operator may operate different packet core networks in conjunction with radio access networks for any number of reasons. In one example, multiple core networks are operated to provide redundancy and to ensure reliable communication. If a first packet core network is taken offline for maintenance of upgrade of equipment, a second packet core network may be switched in in its place, through suitable network switching elements, for a period of time. In another example, the network operator may have multiple generations of equipment in place. A legacy 3G or LTE system may still be operational even as a new 5G core network is built out. Each generation of technology may require updated network equipment. Because of backward compatibility, the legacy equipment may satisfactorily handle some or all communications for the new radio access network. Further, data packets and packet addressing have had a change in format, from IPv4 to IPv6, requiring or permitting a change in network equipment. Still further, as a new packet core network is built out, it may have temporary availability limitations when part of the new packet core network is not available or are not reliably available. Still further, certain aspects of network performance or availability may be limited for short durations. For example, as data center proxies are being getting updated, one video application by one provider may work normally but another application by another provider may not function normally. In another example, a first packet core network may be overloaded with traffic and, as a result, provide poor performance. In yet another example, one core network may be subject to a cyberattack. Even if the packet core network is in service, issues of reliable availability are known to occur to prevent or limit network access by a mobile device or to cause suboptimal or unacceptable performance.

From the perspective of the mobile device 202, the source of a performance problem may not be discernible. The mobile device 202 may automatically be associated with a particular packet core network, such as first packet core network 212. The mobile device 202 may experience completely normal service in conjunction with the first packet core network 212. However, in some instances, the mobile device 202 may experience short term unreliability such as slow data rates, or the mobile device may experience unacceptable performance for particular operations, such as streaming a video file from the one of the other networks 224, through the first packet core network 212 and the RAN 204. The noted problem may be even more localized, such as a first video streaming application that provides excellent service through the first packet core network 212 and a second video steaming application that provides unacceptable service through the first packet core network 212.

In accordance with various aspects described herein, a mobile device operating on a mobility network may implement intelligent selection of resources of a packet core network to improve user experience operating the mobile device. Improvement of user experience may include increasing reliability of communication, improving data throughput, reducing latency, and avoiding delays due to high data traffic in the network.

In embodiments, network components including a mobile device operate, in a first step, to detect failures and poor performance in communication with the network. A communication failure may be any degradation in communication service, such as quality of service, longer data latency, slower throughput or other reduction in performance, however measured. Such reduction in performance can include any protocol-specific connectivity problems, such as slow download of streaming video from a third-party supplier over the mobility network, where the protocol includes streaming video. Reduction in performance can include high latency when scrolling in a particular social media application program, where the protocol includes the application program, the remote data source, the scrolling of the user interface and the provision of data at a rate suitable so that the scrolling seems to be constant, never delayed or jittery. Such poor performance can include low throughput due to proxies, firewalls and network fragmentation. Such poor performance can include issues with latency or capacity that may provide a poor user experience. This may include, for example, dropped packets. Such poor performance can include poor performance due to lax or uneven security, such as a distributed denial of service (DDOS) attacks on the network provider. The network including the mobile device may make us of any additional detection mechanisms that may be suitable as well as any subsequently developed detection mechanisms in the future.

In a second step, the network components including the mobile device activate additional packet core networks or network slices. For example, the mobile device automatically connects to a legacy packet core network or network slices in a process of intelligent core reselection. This results in additional or parallel IP addresses, referred to multiple network connections. As a result, one data communication protocol or protocol on the mobile device such as streaming video can use one packet core network while another protocol on the mobile device such as scrolling social media uses a different packet core network. In other embodiments, the entire connection for all protocols is moved to a substitute core network, similar to a radio network handing off a mobile device from one base station to another. In some embodiments, the mobile device operates to rank connectivity and performance of the existing or old core network and a selectable new core network. In some cases, poor connectivity may be temporary while one protocol is being used. As an example, a virtual private network VPN performance may provide poor performance using wither Internet Protocol security (IPSec) or a Secure Sockets Layer (SSL) connection. The mobile device may keep or drop connections that do not meet proper security criteria.

In a third step, the network components including the mobile device return to the original configuration. For example, the mobile device may evaluate if mobile device can return to newest packet core again. In an example, the mobile device is a 5G cellular phone. Because of poor performance using the network provider's 5G cellular packet core network, the mobile device may elect to switch one protocol or all operations to a legacy network, such as the network provider's LTE network. If the application or operation that prompted the switch ends or is no longer affected, the mobile device may elect to switch back to the 5G cellular packet core network. The decision to return to the original network or switch to a different packet core network may be made based on evaluation of a timer or based on a count value exceeding a threshold.

Figure 2D:
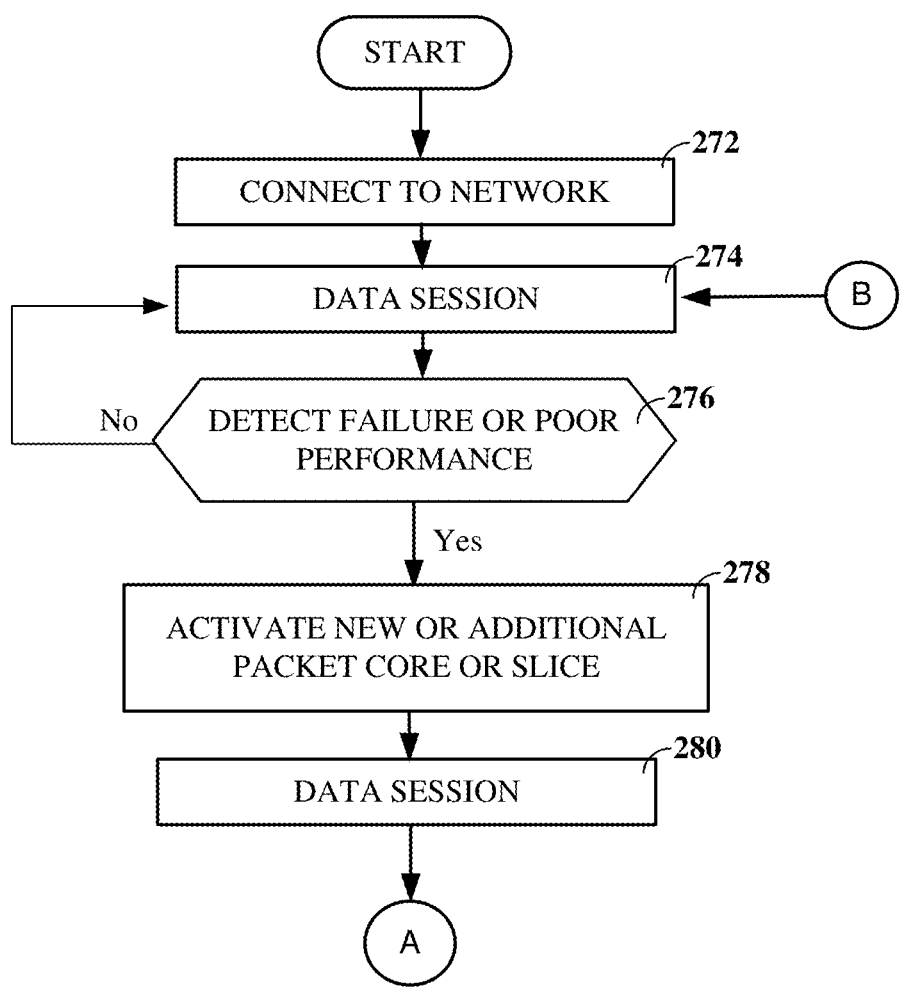
FIGS. 2D and 2E depict an illustrative embodiment of a method in accordance with various aspects described herein.
Figure 2E:
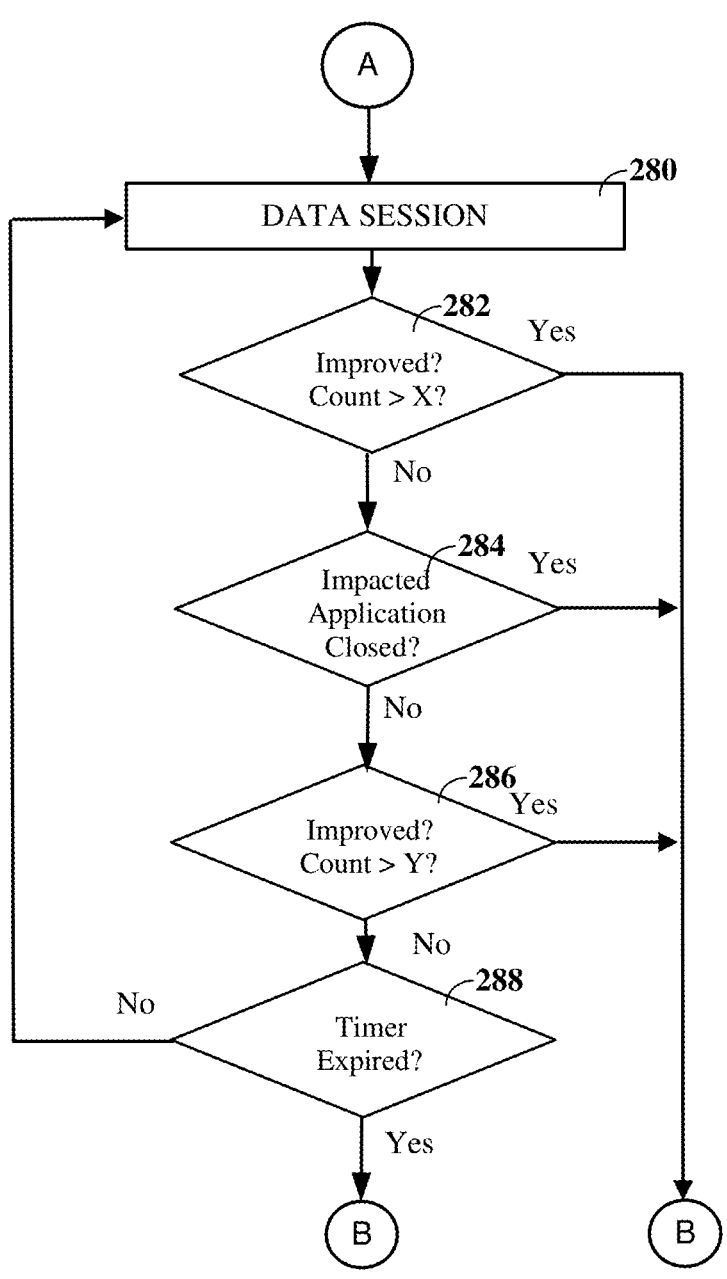

FIGS. 2D and 2E depict an illustrative embodiment of a method 270 in accordance with various aspects described herein. The method 270 may be implemented by a mobile device or user equipment (UE) operating in a mobility network such as a cellular telephone system. In some embodiments, the mobile device incorporates a technology level or technology generation and may include a most-current technology generation or technology level. For example, at a time when 5G cellular is new, the mobile device may be implemented as a 5G cellular smartphone. As a smartphone, the mobile device has a user interface that can allow the mobile device to play streaming video and audio, to participate in online gaming, to implement virtual reality and augmented reality, to participate in social media including infinite scroll media, and to make voice calls. Such functions are accomplished over a network with one or more remote services, such as a video streaming service, a social media provider, and others. The mobile device can attach to a radio access network such as the 5G cellular network and, as a mobile device, can hand off communications among base stations of the mobility network.

The radio access network is supported by and in data communication with a plurality of packet core networks. In an example embodiment, each respective packet core network includes a respective generation of technology. Thus, in the example, a first core network includes 3G cellular technology, a second core network includes 4G cellular or LTE technology, a third core network includes 5G cellular technology and a fourth core network includes 5G cellular technology implemented as a software definable network including a plurality of network slices that are dynamically added to or subtracted from the network according to requirements of mobile devices including the mobile device. The mobile device may select the packet data network with which it will communicate. The mobile device cooperates with the plurality of packet core networks to implement the method 270. The method 270 may be implemented in software, hardware or a combination of these at the mobile device. The method 270 may be implemented as a module including instructions and data for controlling a processing system and memory of the mobile device.

The method 270 begins at block 272 where the mobile device connects to the radio access network. This may be done in a conventional manner in which, through signaling with one or more base stations of the radio access network, the mobile device attaches to the network. The process may be supported by aspects of a packet data network of a plurality of available packet data networks. In an embodiment, as a current-generation device, the mobile device automatically selects the current generation packet data network. For example, a 5G cellular phone will select the 5G cellular technology packet data network. This may be established as a default or may be selectable by the mobile device. The packet data network participates in block 272 by providing registration, account and authentication information for the mobile device and by establishing a connection to one or more remote packet data networks for access by application programs and other features of the mobile device to network provided services.

At block 272, the mobile device enters a data session. In an exemplary data session, the mobile device exchanges data over the radio network and the packet data network with a remote source. The data exchanged may be according to a particular data communication protocol or protocol, where protocol is to be given the widest range of meanings. For example, if the data session involves streaming video, the data may be encoded as MP4 data. In another example, a user of the mobile device is scrolling through a social media application, such as Facebook® or Twitter® on the mobile device. Data including text, graphics, images and videos is encoded according to a unique protocol. The social media provider formats the data according to the protocol and an application program or app on the mobile device receives the data in the protocol format and provides suitable data to the user interface of the mobile device for use by the user.

At block 276, the method 270 includes a test for detecting a failure in communication or poor performance in conduct of the data session of block 274. If no issues are present, the method 270 remains in a loop of block 274 and block 276 including the data session. Any suitable tests or key performance indicators can be used to determine if a failure has occurred in the data session of block 274 or if performance has degraded in the data session. In general, a measurable aspect of the data session, or a selected communication parameter, may be compared with a threshold and, if the threshold is exceeded, a failure or degraded performance may be indicated. Alternatively, depending on the communication parameter and the threshold, if the threshold is not exceeded, a failure or degraded performance may be indicated. Thresholds may be static or dynamic and may be made to depend on any suitable factor.

In a first example of block 276, the mobile device may determine if a data stall has occurred, particularly a data stall in the core packet network. A data stall is indicated if no data has been communicated within a threshold amount of time. The time threshold may be any suitable amount of time such a 100 ms, 5 seconds, etc. The time threshold may be variable based on any factor. For example, if a network is heavily loaded with other traffic, the time threshold may be extended. In another embodiment, the time threshold may be based on an effect on performance of the mobile device. For example, if the mobile device is steaming video and data stalls occur but the stalls are of such short duration that they do not affect playback of the video, the time threshold may be extended. In another embodiment, a data stall may be defined as fewer than a threshold number of bytes of data received over a threshold amount of time. For example, if no more than 1 Kbyte of data is received over a time of 30 seconds, the mobile device may conclude that a data stall has occurred. A data stall is on example of a failure or poor performance.

In another example at block 276, the mobile device may determine if a data latency failure has occurred. Data latency is the time required for data to be stored or retrieved. Data latency may be measured in units of time such as milliseconds or seconds. In an example, an application operating on the mobile device requests data from a remote source. The amount of time elapsed between the request for data a receipt of the data is the data latency. For example, as the user of the mobile device is scrolling through a social media application, the application will issue a call for additional data to populate the display for viewing by the user. If the data latency exceeds a threshold, the mobile device may conclude that a failure or poor performance has occurred. The mobile device may measure and track data latency over a threshold amount of time, such as 15 minutes, to determine a data latency trend. If the trend indicates data latency is increasing to a threshold and likely to become a failure by exceeding the threshold, the mobile device may conclude there is a failure or degraded performance at block 276.

In another example at block 276, the mobile device may determine if a rate of data communication during the data session at block 274 stops or slows below a threshold. The rate of data communication may be measured in any suitable fashion, such as data throughput in Mbps. In an example, if instantaneous data throughput falls below 10 Mbs, the mobile device may conclude that a data stall has occurred. The rate of data communication may be averaged over time, in another example, so that if an average data throughput falls below a threshold such as 10 Mbps for a threshold duration such as 2 minutes, the mobile device may conclude that a data stall has occurred. Low throughput through the packet core network may occur due to existence or performance of proxies or firewalls in the packet core network, or due to fragmentation of the network affecting data transfer.

In another example at block 276, the mobile device may determine if a number of dropped packets has exceeded a threshold. A dropped packet may require a request for retransmission of the packet. The number of dropped packets may be averaged over a time threshold, such as one minute, and if the number of dropped packets exceeds the threshold, the mobile device may conclude that a failure or degradation of performance has occurred.

In another example at block 276, the mobile device may determine if an error message has been received. In an example, a web browser application operating on the mobile device may try to access a web page on a server accessible over the internet. The data communication protocol or protocol in this example includes a web browser using hypertext markup language (HTML) to render a page on a user interface of the mobile device. Because of a failure in the core network, the browser receives no data and returns an error message saying that the requested page cannot be found. The mobile device may conclude that a failure or degradation of performance has occurred.

In another example at block 276, the mobile device may determine if a security failure has occurred. An example is a distributed denial of service (DDOS) attack, which takes advantage of specific capacity limits of resources of the packet core network. If the mobile device detects a security failure or threat, the mobile device may conclude that a failure or degradation of service has occurred.

In another example at block 276, the mobile device may determine if a protocol-specific connectivity failure has occurred for an active protocol. A protocol may be specific to a type of data being communicated or an application program which consumes or generates data when the application program is active. A protocol may be an active protocol or an idle protocol. For example, if the mobile device has an active virtual private network (VPN) and is downloading a file to local file storage, the VPN and the file access are active protocols. If the mobile device has installed a game application and a social media application that are not currently being used by a user of the mobile device, the game application and the social media application are idle protocols. The mobile device may identify active protocols of the mobile device, including application programs that are currently receiving or generating data and functional protocols such as video encoding functions and audio encoding functions that are currently processing data exchanged with the core network. The mobile device may further identify a protocol specific data connection for an active protocol. For example, if the mobile device is receiving a social media scroll at a particular destination IP address from a particular IP source address, the mobile device may use this IP address information to identify the protocol-specific data connection for the social media scroll. A failure may be determined if the communication of data is slowed or interrupted in such a manner as to cause an effect on the user experience of the mobile device. Any suitable protocol-specific threshold may be used to test the protocol-specific connectivity failure.

Any other suitable detection mechanism may be used at block 276 to determine if data communication at the mobile device has failed or is in danger of failing, or if performance has degraded or is in danger of degrading. In some embodiments, failure is predicted or estimated before any failure actually occurs so that corrective steps may be taken before the failure occurs. Degradation of performance may be used to predict failure.

At block 278, responsive to the failure or degradation at block 276, a new or additional packet core network or network slice is activated. In a first embodiment, the mobile device established a data session at block 274 using a current-generation technology packet data core. At block 278, responsive to the failure at block 276, the mobile device makes an intelligent core reselection to an alternative, legacy core network. For example, if the mobile device is a 5G cellular smartphone initially using a 5G software defined network with one or more network slices performing the packet core functions, upon detection of the failure at block 276, the mobile device may select an available LTE core network for continuing the data session.

The reselection or handover from a first core network to a second core network may be done in any suitable manner. In one embodiment, the mobile device specifies a different access point name (APN) for the second core network. An access point name may be the name of a gateway between a mobile network and the core network. A mobile device making a data connection must be configured with an APN to present to the carrier. The carrier will use the APN to determine what type of network connection should be created, which internet protocol (IP) addresses should be assigned to the mobile device, which security method should be used and how the mobile device should be connected to third-party networks. Generally, the APN includes a network identifier and an operator identifier. In an example, the mobile device may initially specify an APN of "nrphone" to access a 5G cellular core network. To request a change to an alternative core network, the mobile device may specify an APN called "nextgenphone" to access an available LTE core network. Block 278 may include specifying an alternate APN to select an alternative or additional core network.

In some embodiments, the entire connection or the entire data session or entire network access by the mobile device is moved from the first core network to the second core network. The mobile device may have multiple data streams in process, for example a video stream, a social media scroll, and a file upload. In an embodiment, the entire connection including all data activity on all protocols is moved to the second core network when the first core network degrades or fails.

In another embodiment, handover may be done on a protocol-by-protocol basis. For example, if a mobile device is simultaneously engaged in streaming video to a first network destination and scrolling a social media account from a second network source, the mobile device may determine a degradation in the social media data connection. The mobile device may select an alternative core network for just the degraded social media data connection. The mobile device hands over the social media data connection to the alternative core network, leaving the video streaming data connection in place with the first network. This may result in additional IP addresses or parallel devices for the functions within the mobile device. These are referred to as packet data protocol (PDP) connections. Thus, one protocol of the mobile device can use one core network while another protocol of the mobile device uses another core network.

In some embodiments, the mobile device may test connectivity on the second core network before handing over communications from the first core network to the second core network. Testing and verification may include any suitable process. In an example, the mobile device tests the second network for the operational characteristic that prompted the determination of failure in block 276. For example, if throughput for a streaming video through the first core network is degrading and indicating an imminent failure, the mobile device may initiate a connection through the second core network and test throughput on the second core network. The test may include the same protocol, such as data encoding, data for a particular app or user function. If connectivity is better on the second network, the mobile devices complete the activation of the second network. Connectivity may be measured and compared in any suitable fashion, using any suitable threshold or thresholds.

In some embodiments, if the mobile device has access to multiple core networks, the mobile device may score and rank the mobile networks according to connectivity. In an example, the mobile device may determine that a first packet core network has throughput of 20 Mbps, a second core network has throughput of 10 Mbps and a third core network has throughput of 5 Mbps. Measurements may be made for a particular selected protocol, such as MP4 encoded video from a particular selected source such as youtube.com. The core networks may then be ranked according to performance. If multiple protocols are tested, the multiple protocols may be combined in any suitable way to rank the individual core networks. For example, a weighting may be applied based on relative usage of a protocol by the user of the mobile device. If the user frequently streams videos on the mobile device but only occasionally uses a virtual private network (VPN) on the device, the mobile device may weight each core networks video streaming performance more heavily than VPN performance. A core network that provides superior video streaming may then be ranked higher than another core network. The rankings may be used to select a second core network to hand over one data protocol or a group of data protocols.

Thus, activating a new core network, or activating a new network slice, at block 278, may include adding an additional core network or network slice directed toward improving the degradation or failure noted ate block 276. This may include move one or a subset of the existing data connections to the new core. Further, activating a new core network or activating a new network slice may include moving all data connections to the new core network or new network slice. Generally, all core networks are maintained and operated by a single service provider or network operator in conjunction with a mobility network that serves mobile devices such as the mobile device. This may be varied in some particular applications where core network features or functions are shared among network operators or service providers.

At block 280 a new data session is initiated or the existing data session of block 274 is resumed. The new connection activated at block 278, using the newly activated or added packet core function, is used for the new data session. In the process of block 274, block 276, block 278 and block 280 of method 270, the communication between the mobile device and remote data connections of other packet data networks is handed over from a first core network of the service provider to a second core network of the service provider. This core network handover is analogous to handover among base stations by a mobile device on a radio network.

Handover or hand off is a process mobile communication networks in which cellular communication of voice or data is transferred from one base station or cell site to another base station or cell site without losing connectivity to the cellular transmission. Handover among base stations is an essential function for mobility, as the mobile device moves across a region, among cell coverage areas. To maintain communication with the network, the communication is handed over from a source base station to a destination base station. As a communication channel with the source base station degrades because of increasing distance or noise or other effects, a communication channel with the destination base station will improve because of declining distance or noise or other effects. At a threshold point, the handover from the source base station to the destination base station is triggered and all communication between the mobile device and the network is transferred from the source base station to the destination base station.

In the process of method 270, the mobile device identifies a degradation in communication, or a failure, and initiates a handover. The handover of method 270 is a handover from a source core network to a destination core network. The handover of method 270 may include all communication, or all data connections, between the mobile device and the network. In some embodiments, the handover of method 270 may include only some data connections from the mobile device to remote data sources.

A handover between base stations may be a hard handover or a soft handover. In a hard handover, the radio with the source base station is released before the radio channel with the target base station is engaged. In hard handover, the connection to the source base station is broken just before or along with completing the connection to the target base station. In a soft handover, the radio channel with source base station is retained and works in parallel with the radio channel with the target cell for a time period. In this case, connection to the target base station is established before connection to the source base station is broken. Soft handover allows a parallel connection between several channels to provide better service and more reliable handover.

In some embodiments, the method 270 enables a type of soft handover. As noted, the mobile device may test a new data connection through a new or destination core cell. In particular, the mobile device may test the quality of a particular communication metric for a particular protocol, such as throughput on a streaming video connection, before deciding to activate the new core network or new network slice. The mobile device may then maintain one or more data connections through the source core cell and initiate one or more data connections through the destination core cell. Each respective data connection has a respective IP address or PDP connection.

In some embodiments, portions of the method 270 may be repeated in order to maintain reliable data connections for the mobile device. Thus, block 276, block 278 and block 280 may be repeated as each maintained data connection through each respective core network is tested for performance degradation. If a degradation of one or more protocols is detected, a new core network or network slice may be identified with better service and activated.

FIG. 2E illustrates operations of method 270 for evaluating if the mobile device, having switched to a destination packet core network, can return to the source packet core network. In one example, the source packet core network is the current generation technology core network, such as a 5G cellular packet core network, and the destination core network is a legacy, previous generation technology core network such as an LTE core network.

In FIG. 2E, the data session at block 280 proceeds with at least one data connection maintained through the destination network. At block 282, a test is made to see if the data connection to the source core network has improved enough to permit returning the data connection from the destination core network to the source core network. Any suitable test may be performed, including testing the key performance indicator or other communication factor that failed or degraded at block 276 (FIG. 2D). In other embodiments, a full complement of selected key performance indicators may be tested before switching back to the source core network to ensure that no other degradation has occurred. If the quality and reliability of the communication through the source core network has improved, control proceeds to block 274, FIG. 2D. This may involve another handover operation to transfer one or more data connections from the destination core network to the source core network.

Further, at block 282, a test may be performed to determine how many times communication among the source core network and destination core network has been changed. The goal is to prevent ping-ponging of the connection, in which the connection changes frequently. The mobile device may maintain a counter and increment the counter each time a network change is made. If the number of network changes exceeds a threshold value, such as 5, the mobile device may preclude further changes for a time period, such as one hour. In an alternative embodiment, the mobile device may evaluate the number of network changes per a threshold amount of time, such as one minute. This forms a rate of network changes. If the rate of network changes exceeds a threshold, such as 5 network changes per minute, the mobile device may preclude further changes for a time, such as thirty minutes.

At block 284, the mobile device determines in the application or protocol that was impacted by the failure at block 276 (FIG. 2D) has been closed or terminated on the mobile device. In an example, the user of the mobile device had initiated a VPN that subsequently degraded, requiring handover the destination core network. At block 284, the mobile device determines if the VPN is still operational or has been terminated. If the VPN or other affected application is no longer operational, the handover connection to the destination core network should be dropped to conserve network resources. If the affected application has been closed, control returns to block 274, FIG. 2D. This may involve another handover operation or may simply require closing a data connection with the destination core network.

At block 286, the mobile device determines if the data connection to the source core network has improved enough to permit returning the data connection from the destination core network to the source core network. Any suitable test may be performed, including testing the key performance indicator or other communication factor that failed or degraded at block 276 (FIG. 2D). If the quality and reliability of the communication through the source core network has improved, control proceeds to block 274, FIG. 2D. This may involve another handover operation to transfer one or more data connections from the destination core network to the source core network. Further, at block 286, an additional test may be performed to determine how many times communication among the source core network and destination core network has been changed. The mobile device may maintain a counter and increment the counter each time a network change is made. If a maximum count threshold, such as 5 network changes is exceeded, or a maximum rate threshold such as 3 network changes per minute, is exceeded, the mobile device may inhibit further changes for a time period.

At block 288, a timer is tested to determine if returning the data connection from the destination core network to the source core network is required. Any suitable timer value, such as one hour, may be used. The timer sets a maximum time period for evaluating the desirability of returning the data connection to the source core network. If the timer has elapsed, control proceeds to block 274, FIG. 2D. This may involve another handover operation to establish a new data connection with the source core network for the affected protocol. If the timer has not expired, control returns to block 280 and the data session continues over the destination core network.

In accordance with the features described herein, the system 200 and the method 270 enable intelligent handoff by a mobile device of a packet core or data center based on quality or reliability of communication through the packet core. The mobile device monitors quality of communications and selects a new data core for one or more protocols as required. This enables intelligent rerouting of data to a different packet core when a core performance becomes degraded. This can be due to traffic overload or capacity, a network upgrade gone wrong, or DDOS attack or other security failure. The ability to automatically detect degraded performance and hand over the data communication can dramatically enhance user experience for the user of the mobile device. Further, this can enable the network operator to provide fast, reliable service to customers and, based on handovers among the core networks of the operator, the network operator can identify, isolate and correct sources of unreliable performance in a core network. This is particularly valuable as a new network is brought online and requires troubleshooting but with minimal customer impact.

While for purposes of simplicity of explanation, the respective processes are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
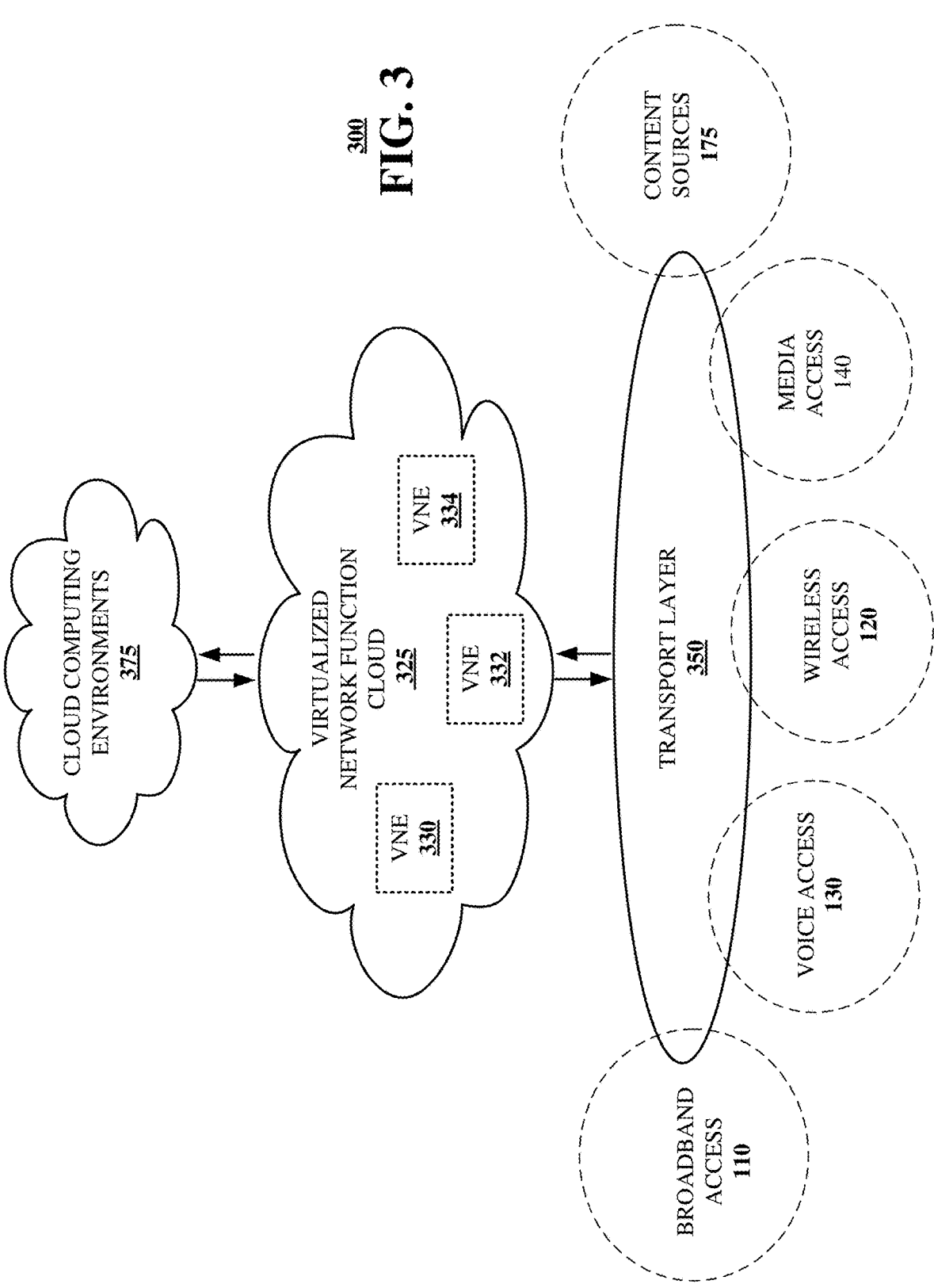
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 270 presented in FIGS. 1, 2A, 2B, 2C, 2D and 2E, and 3. For example, virtualized communication network 300 can facilitate in whole or in part detecting a failure or poor performance in a packet core network serving a radio access network, activating an additional or alternative packet core network to hand off communication to the additional or alternative packet core network until the poor performance or failure has been corrected.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
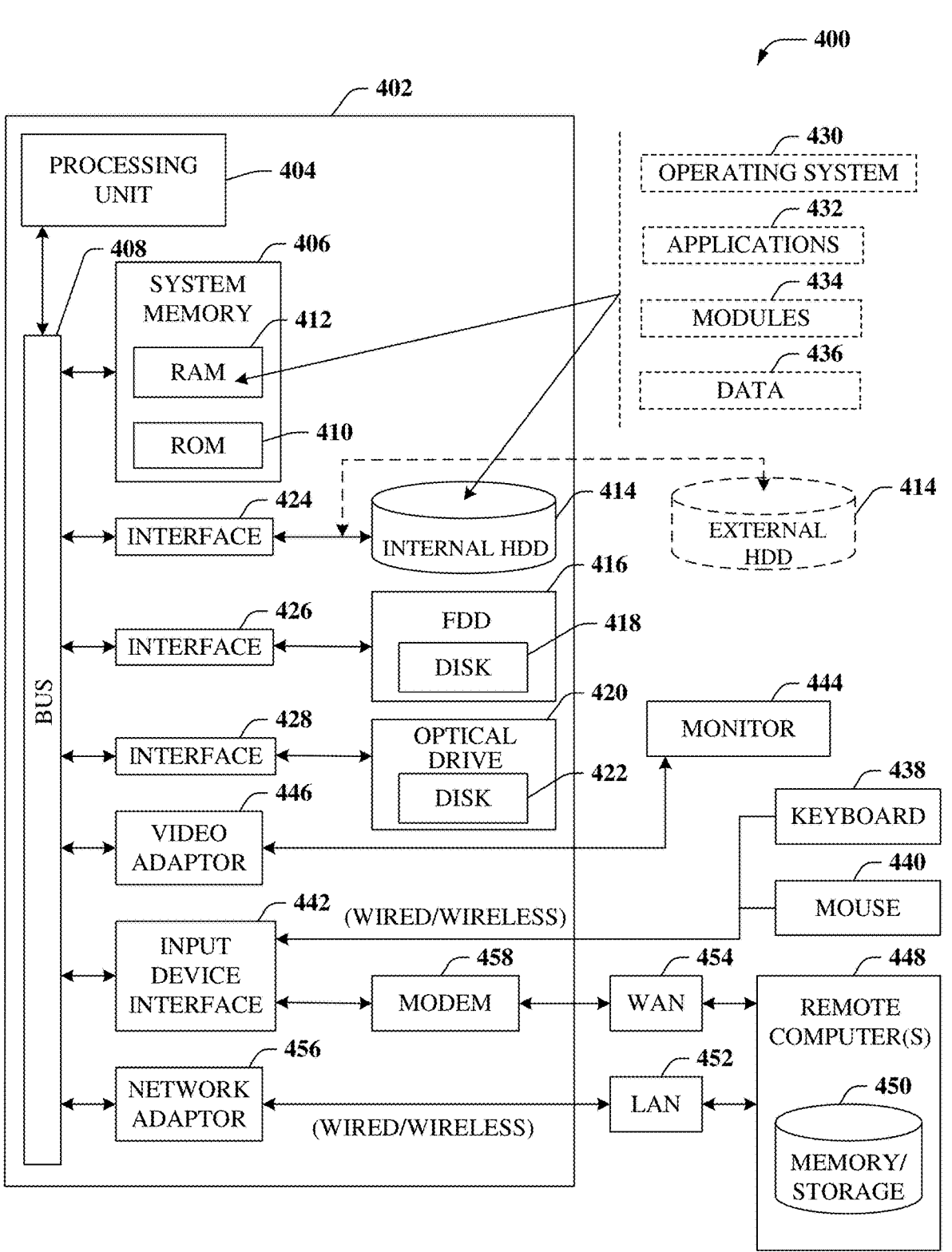
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part detecting, in a mobile device including aspects of the computing environment 400, a failure or poor performance in a packet core network serving a radio access network and activating an additional or alternative packet core network to hand off communication to the additional or alternative packet core network until the poor performance or failure has been corrected.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
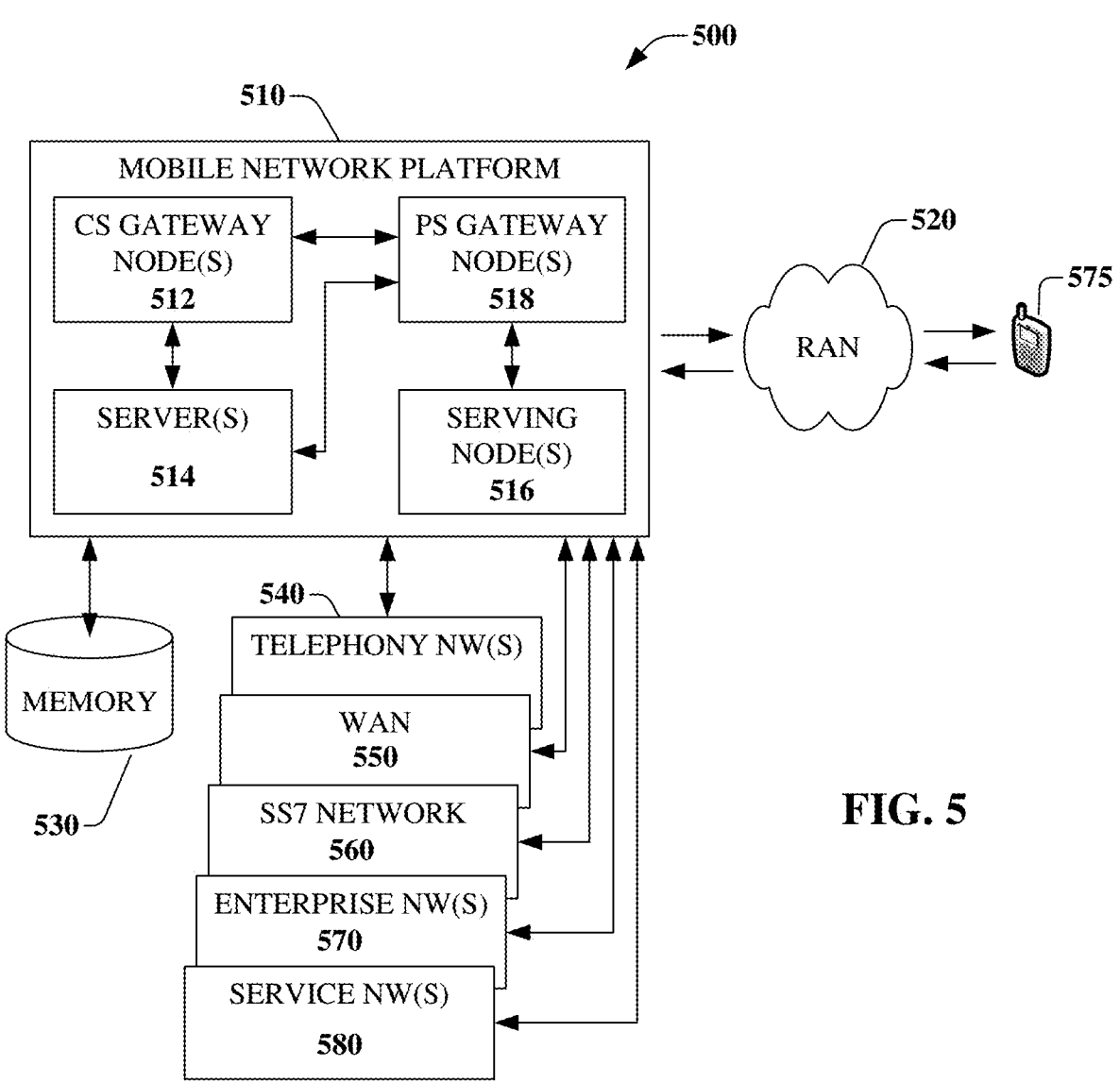
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part detecting a failure or poor performance in a packet core network serving a radio access network (RAN), and activating an additional or alternative packet core network to hand off communication to the additional or alternative packet core network until the poor performance or failure has been corrected. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
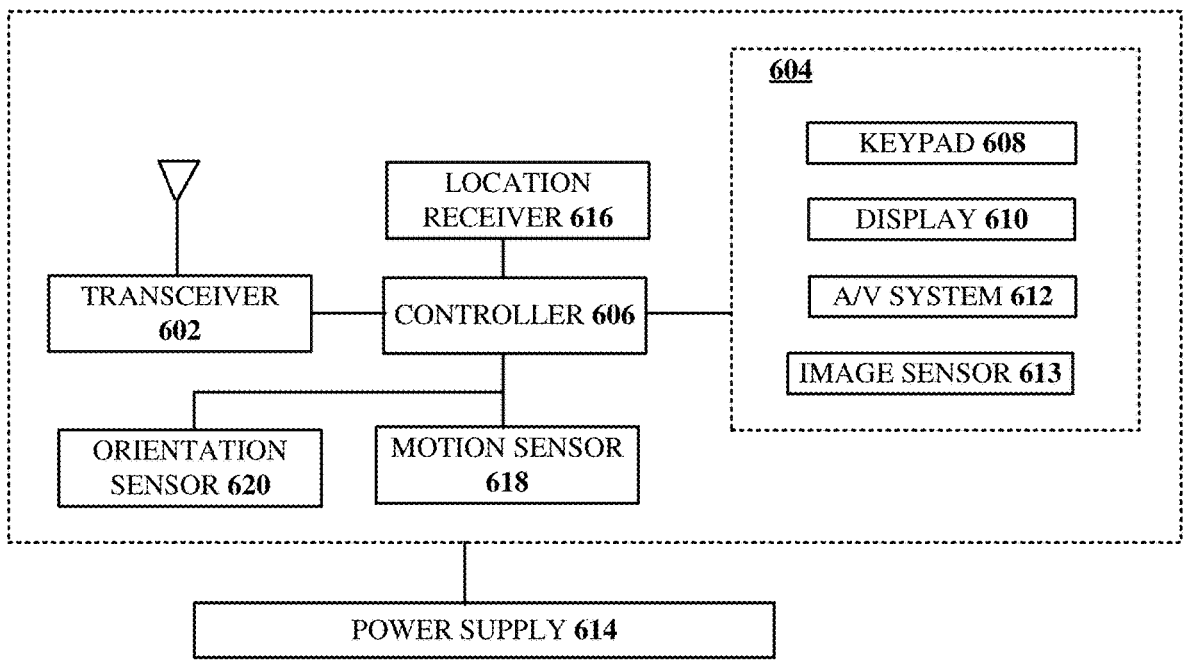
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communication network 125. For example, communication device 600 can facilitate in whole or in part detecting, by a mobile device such as the communication device 600, a failure or poor performance in a packet core network serving a radio access network to which the communication device 600 is attached, activating an additional or alternative packet core network to hand off communication with the communication device 600 to the additional or alternative packet core network until the poor performance or failure has been corrected.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
connecting the device to a radio access network, wherein the connecting comprises communicating with a first core network of a plurality of core networks available to the device;
communicating with a remote network through the first core network;
identifying a degradation in a key performance indicator for the communicating with the remote network through the first core network;
selecting a second core network of the plurality of core networks, wherein the first core network is configured to utilize at least one communications technique that the second core network does not utilize and the at least one communications technique comprises a software definable network including a plurality of network slices;
initiating communication with the second core network;
communicating with the remote network through the second core network to eliminate the degradation in the key performance indicator for the communicating with the remote network;
testing if the degradation in the key performance indicator due to a communication failure of the first core network continues; and
reinitiating communication with the first core network by the device responsive to the testing.

2. The device of claim 1, wherein the identifying a degradation in a key performance indicator comprises:
determining if a data stall has occurred in the first core network; and
identifying the degradation in a key performance indicator responsive to an occurrence of a data stall.

3. The device of claim 1, wherein the identifying a degradation in a key performance indicator comprises:
comparing data throughput from the first core network to the device with a predetermined threshold; and
identifying the degradation in a key performance indicator responsive to the data throughput failing to exceed the predetermined threshold.

4. The device of claim 1, wherein the identifying a degradation in a key performance indicator comprises:
identifying a degradation in a key performance indicator for a particular data communication protocol of a plurality of active data communication protocols of the device.

5. The device of claim 4, wherein the operations further comprise:
identifying a data connection associated with the particular data communication protocol; and
moving the data connection from the first core network to the second core network.

6. The device of claim 1, wherein the operations further comprise:
moving entire connections for all data communication protocols to the second core network.

7. The device of claim 1, wherein the first core network comprises a current-generation technology packet core network.

8. A non-transitory machine-readable medium, comprising executable instructions that, when executed by a processing system including a processor, facilitate performance of operations, the operations comprising:
attaching a mobile device to a radio access network operated by a service provider;
communicating, through the radio access network, with a first packet core network of a plurality of packet core networks operated by the service provider;
communicating with a remote network source, wherein the first packet core network provides packet data communication between the remote network source and the mobile device;
identifying a communication degradation due to a communication failure of the first packet core network, wherein the identifying comprises comparing a selected communication parameter with a predetermined threshold value;
selecting a second packet core network of the plurality of packet core networks operated by the service provider, wherein the selecting is responsive to the selected communication parameter failing to exceed the predetermined threshold value, and wherein the first packet core network utilizes at least one communications technique that the second packet core network does not utilize, and wherein the at least one communications technique comprises a software definable network including a plurality of network slices;

initiating communication with the second packet core network by the mobile device through the radio access network;

communicating with the remote network source, wherein the second packet core network provides packet data communication between the remote network source and the mobile device;

testing communication performance of the plurality of packet core networks; and selecting a current-generation technology packet core network.

9. The non-transitory machine-readable medium of claim 8, wherein the operations further comprise:

establishing a plurality of data connections between the mobile device and the first packet core network, wherein each respective data connection of the plurality of data connections is associated with a respective data communication protocol and each respective data connection is associated with a respective internet protocol (IP) address;

identifying a degraded data connection of the plurality of data connections, wherein the degraded data connection is characterized by the communication degradation due to communication failure of the first packet core network; and moving only the degraded data connection of the plurality of data connections from the first packet core network to the second packet core network to improve performance of the degraded data connection.

10. The non-transitory machine-readable medium of claim 8, wherein the operations further comprise:

ranking the plurality of packet core networks according to the testing; and selecting a packet core network according to the ranking.

11. The non-transitory machine-readable medium of claim 8, wherein the operations further comprise moving entire connections for all data communication protocols to the second packet core network.

12. The non-transitory machine-readable medium of claim 8, wherein the operations further comprise:

testing if the communication degradation due to a communication failure of the first packet core network continues; and reinitiating communication with the first packet core network by the mobile device responsive to the testing.

13. The non-transitory machine-readable medium of claim 8, wherein the operations further comprise:

identifying an impacted application program of the mobile device, wherein the impacted application program experienced a performance reduction due to the communication failure of the first packet core network;

determining if the impacted application program has been closed on the mobile device; and reinitiating communication with the first packet core network by the mobile device responsive to the determining the impacted application program has been closed on the mobile device.

14. A method, comprising:

detecting, by a processing system including a processor, a communication failure of a data connection between a mobile device and a source core network of a plurality of core networks available to the mobile device, the mobile device communicating with a respective core network of the plurality of core networks through a radio access network;

selecting, by the processing system, a destination core network of the plurality of core networks, wherein the source core network utilizes at least one communications technique that the destination core network does not utilize and wherein the at least one communication technique comprises a software definable network including a plurality of network slices;

handing off, by the processing system, the data connection from the source core network to the destination core network;

identifying a communication degradation due to the communication failure of the data connection between the mobile device and the source core network, wherein the identifying comprises comparing a selected communication parameter with a predetermined threshold value;

testing if the communication degradation due to the communication failure of the source core network continues; and reinitiating communication with the source core network by the mobile device responsive to the testing.

15. The method of claim 14, wherein the detecting a communication failure of the data connection comprises:

comparing, by the processing system, data throughput of the data connection with a threshold; and identifying, by the processing system, a communication failure of the data connection responsive to the comparing.

16. The method of claim 15, further comprising:

measuring, by the processing system, data throughput of the destination core network, producing destination throughput;

comparing, by the processing system, the destination throughput with a throughput threshold; and initiating, by the processing system, the handing off the data connection responsive to the destination throughput exceeding the throughput threshold.

17. The method of claim 14, wherein the detecting a communication failure of the data connection comprises:

identifying, by the processing system, an active protocol of the mobile device;

identifying, by the processing system, a protocol-specific data connection of the active protocol;

determining, by the processing system, an interruption of the protocol-specific data connection; and handing off, by the processing system, the protocol-specific data connection from the source core network to the destination core network.

18. The method of claim 14, wherein the detecting a communication failure of the data connection comprises:

identifying, by the processing system, a plurality of active protocols of the mobile device;

identifying, by the processing system, a respective protocol-specific data connection of each respective active protocols of the plurality of active protocol;

measuring, by the processing system, a key performance indicator of each respective protocol-specific data connection; and ranking, by the processing system, respective protocol-specific data connections, wherein the ranking is responsive to the measuring.

19. The method of claim 18, further comprising:

selecting, by the processing system, the destination core network according to the ranking.

20. The method of claim 14, wherein the handing off the data connection from the source core network to the destination core network comprises:

handing off, by the processing system, the data connection from a current-technology generation packet core network to a legacy core network during the communication failure of the data connection.

\* \* \* \* \*